Oct. 16, 1962     A. MUSSCHOOT     3,058,577
DEBRIS GUARDS FOR RUBBER SPRINGS
Filed July 20, 1960     3 Sheets-Sheet 1
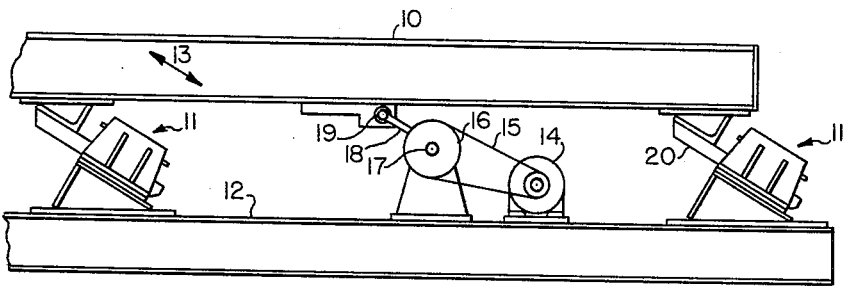
Fig. I
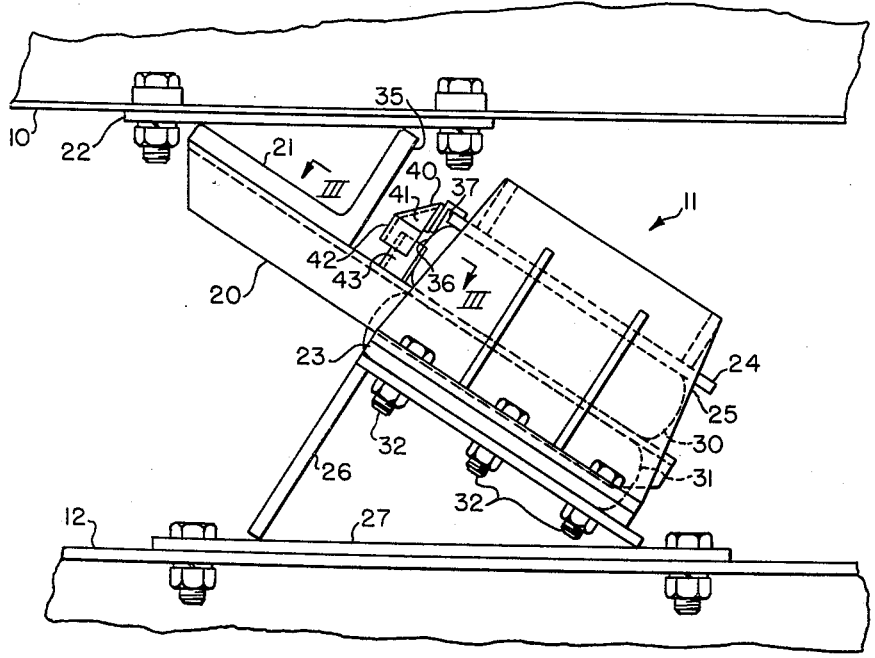
Fig. II
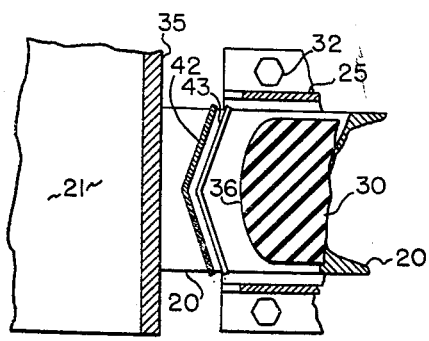
Fig. III
INVENTOR.
ALBERT MUSSCHOOT
BY
Marshall & Wilson
ATTORNEYS

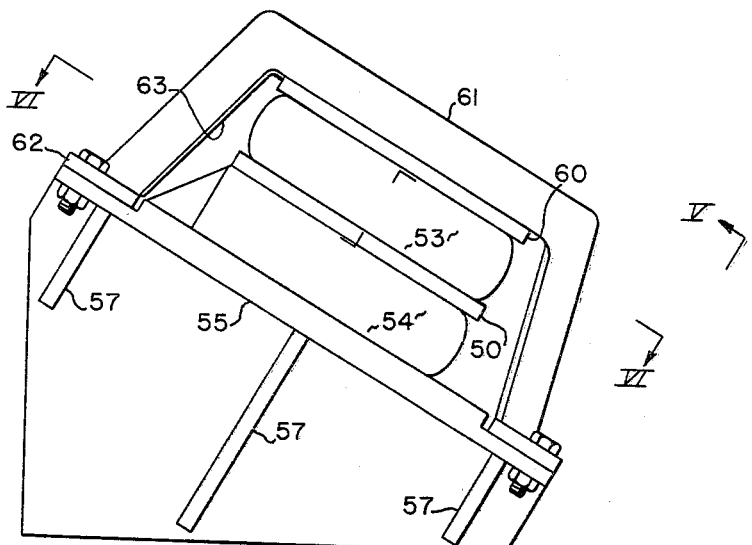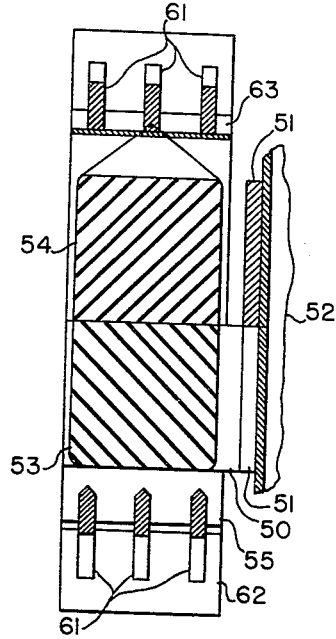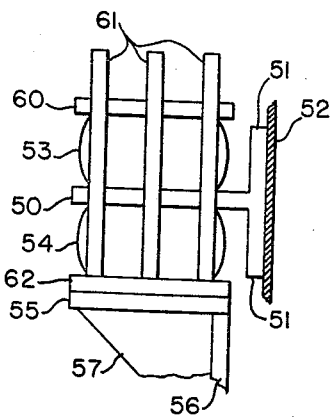

Oct. 16, 1962 — A. MUSSCHOOT — 3,058,577
DEBRIS GUARDS FOR RUBBER SPRINGS
Filed July 20, 1960 — 3 Sheets-Sheet 3
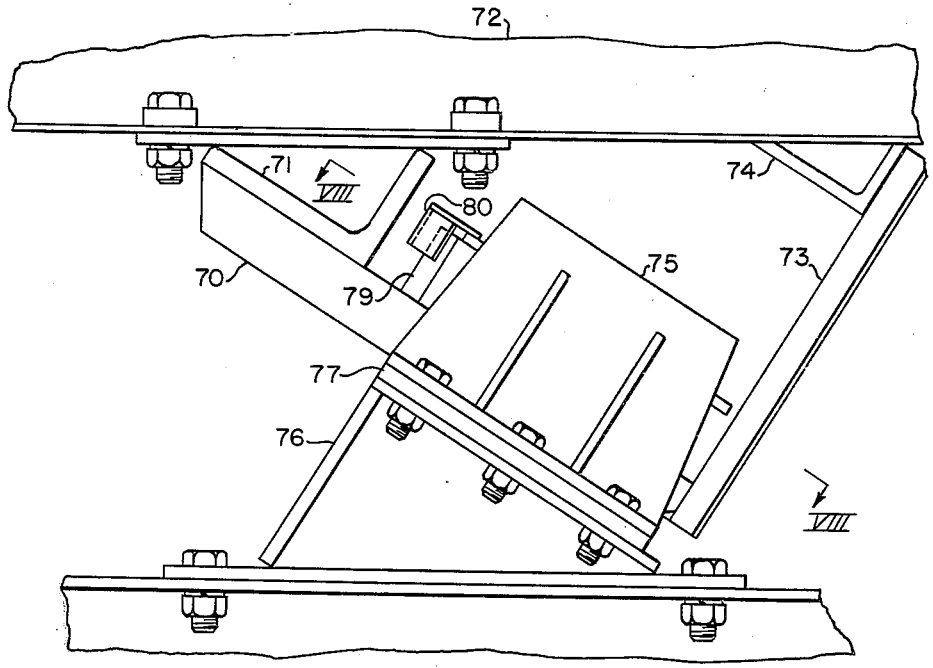
Fig. VII
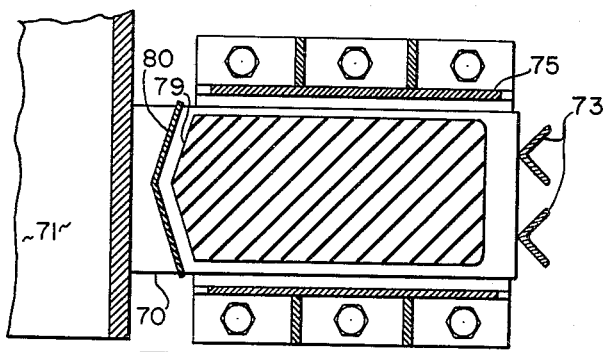
Fig. VIII
INVENTOR.
ALBERT MUSSCHOOT
BY
*Marshall & Wilson*
ATTORNEYS

United States Patent Office 3,058,577
Patented Oct. 16, 1962

3,058,577
DEBRIS GUARDS FOR RUBBER SPRINGS
Albert Musschoot, Anchorage, Ky., assignor to Chain Belt Company, Milwaukee, Wis., a corporation of Wisconsin
Filed July 20, 1960, Ser. No. 44,139
7 Claims. (Cl. 198—220)

This invention relates to vibratory apparatus and in particular to an improved arrangement of rubber springs stressed in shear and arranged with cooperating members to be self cleaning.

Commercially practical resilient mounts for vibratory apparatus may be made of rubber or elastomer blocks used in pairs and clamped between surfaces of a tongue extending from the vibrating member and opposing surfaces of a base and stressed in shear by vibratory movement of the member. If the blocks are initially compressed in a direction perpendicular to the path of the vibratory movement by an amount approximately equal to twenty percent of their free height the friction force between the blocks and the adjacent surfaces is sufficient to prevent slipping between the surfaces of the rubber blocks and the adjacent surfaces of the work member and base. For most satisfactory results in a vibratory conveyor the rubber or elastomer blocks are proportioned so that the thickness is approximately half of the width and the width is approximately half of the length. The blocks are oriented to be compressed along their least dimension and stressed in shear along their lengths by the normal vibratory movement of the members. When so arranged the system may be easily driven to the desired amplitude of vibration in the direction parallel to the long axis of the rubber blocks while vibrations in the other directions are minimized.

When elastomer blocks are used as supports for vibratory members in environments subject to the accumulation of granular material or other debris around the base of the equipment difficulties have been experienced with the accumulation of debris in the space between the ends of the elastomer blocks and the adjacent portions of the base. The debris accumulating in this particular space applies an end force to a portion of the elastomer blocks during the normal vibratory cycle and this force in addition to the shear force exerted between the faces of the elastomer blocks is sufficient to cause slipping between the face of the block and the adjacent portion of the work member tongue or base. This slipping results in heating of the adjacent surfaces beyond the deterioration point of the rubber or elastomer thus causing failure of this particular portion of the block. Upon the failure of the first portion the stresses are transferred to other portions of the block resulting in slippage of those portions and thus the deterioration soon spreads through the entire block.

The principal object of this invention is to arrange either the ends of the elastomer blocks or the portions of the work member and base adjacent thereto so that any debris tending to accumulate at the ends of the blocks is discharged laterally from such space by the ordinary vibratory movement of the members.

Another object of the invention is to provide a simple mounting for elastomer vibratory elements arranged with escape paths for any debris tending to accumulate near the ends of such elements in position to interfere with their free movement.

These and more specific objects and advantages are apparent from the following description of a preferred form of the invention.

According to the invention either the upper ends of elastomer blocks serving as resilient elements for a vibratory system or the adjacent portions of a work member or a base are shaped to provide inclined, laterally directed surfaces which in cooperation with the vibratory movement of the members continuously ejects any debris tending to collect in the spaces adjacent the ends of the resilient members.

Preferred embodiments of the invention are illustrated in the accompanying drawings.

In the drawings:

FIG. I is a side elevation of a simple vibratory conveyor in which resilient mounts constructed according to the invention may be employed.

FIG. II is an enlarged side elevation of one of the resilient mounts for the vibratory conveyor shown in FIG. I.

FIG. III is a fragmentary plan view, partly in section taken substantially along the line III—III of FIG. II, of one end of one of the resilient vibratory members and the adjacent portions of the work member and base showing one form of debris guard.

FIG. IV is a side elevation of another form of vibratory mounting suitable for use with a vibratory conveyor in which the side frames of the base are located parallelly adjacent the sides of the conveyor.

FIG. V is a fragmentary end elevation of the mounting as seen from the line V—V of FIG. IV.

FIG. VI is a generally horizontal section taken along the broken line VI—VI of FIG. IV.

FIG. VII is a side elevation of a reinforced mounting similar to that shown in FIG. II.

FIG. VIII is a fragmentary generally horizontal section taken along the line VIII—VIII of FIG. VII.

These specific figures and the accompanying description are intended merely to illustrate the invention and not to impose limitations on its scope.

While the improved vibratory mounts may be employed in various types of vibrating machinery they are particularly adaptable to either straight line conveyors or helical conveyors. A straight line conveyor is illustrated in FIG. I as comprising a conveyor trough 10 that is supported on a plurality of resilient assemblies 11 which, in turn, are mounted on a base 12 so that the conveyor 10 may vibrate along an inclined linear path illustrated by the double-ended arrow 13. The base 12 may be either rigidly attached to a foundation or it may be mounted on resilient supports so that it may vibrate relative to the foundation or structure of a building in which the apparatus is used without transmitting severe vibratory forces to the building structure.

Vibratory movement of the conveyor trough 10 is produced by power delivered from an electric motor 14 through belt 15 to a pulley 16 mounted on a crank shaft 17. The crank shaft 17 is connected through a connecting rod 18 to a rod bearing 19 attached to the lower portion of the conveyor trough 10. Since these crank and connecting rod assemblies are well known this particular assembly is not illustrated in detail.

Each of the vibratory mounts 11 shown in FIG. I comprises, as illustrated in FIG. II, a tongue 20 the upper end of which is rigidly attached to one face of an angle iron 21 that is welded or otherwise attached to a mounting plate 22 bolted to the underside of the conveyor trough 10. The tongue 20 is preferably made of a piece of channel iron the side flanges of which strengthen the web or flat surfaces of the tongue. The tongue 20 extends downwardly along a line generally parallel to the path of vibration illustrated by the arrow 13 through an open ended housing that consists of a base plate 23, a clamping plate 24 and a yoke 25 that is bolted to the base plate 23 and extends over the clamping plate 24. The base plate 23 is preferably one side of an angle iron 26 which in turn is rigidly attached, as by welding, to a base plate 27 which in turn is bolted to the base 12. A pair of elastomer blocks 30 and 31 are interposed between the surfaces of the tongue and the adjacent surfaces of the base plate 23 and the clamping plate 24 and are held compressed between such surfaces when bolts 32 holding the yoke 25 to the angle iron 26 are tightened. The elastomer blocks are compressed approximately twenty percent in tightening the bolts 32 and the resulting force between the elastomer blocks and the adjacent surfaces is sufficient to prevent slippage between the surfaces as the tongue 20 and work member vibrate longitudinally.

In this arrangement the elastomer blocks 30 and 31 are stressed in shear along their major or largest dimension and are stressed in compression along their minimum dimension. They are also resilient in a sidewise direction so that the conveyor may yield to laterally applied forces but since the operating speed is considerably above the natural frequency in this lateral mode of vibration very little motion takes place in the lateral direction.

During the normal operation the full extent of the vibratory movement occurs between a face 35 of the angle iron 21 and the adjacent end 36 of the upper resilient block 30 or an end 37 of the clamping plate 24. If debris is allowed to collect in the space between these surfaces it soon exerts sufficient pressure against the upper portion of the end 36 of the block 30, when the conveyor trough 10 is at the lower right hand end of its path of vibration, to slide the upper surface of the rubber block 30 on the surface of the clamping plate 24. In severe cases this is enough to shift the block 30 with respect to the plate 24 and tongue 20. In other cases it may not be sufficient to slip the whole surface but to slip a portion of that surface enough so that when the tongue 20 reaches the opposite end of its vibratory stroke the previously slipped surface returns to its original position under the shearing stress exerted in the rubber block. This repeated slipping of the rubber surfaces at the operating speed of the vibratory conveyor causes local heating of the rubber or other elastomer leading to its early failure.

In some instances particularly where the vibratory stroke is quite long the accumulation of debris may be sufficient to cause the rubber or elastomer block to creep out of position thus also leading to a failure of the apparatus.

According to the invention this problem is corrected by providing a hood or deflector 40 attached to the upper end 37 of the clamping plate 24. This hood 40 is shaped somewhat like a snow plow having an inclined dividing edge extending along the vertical center plane of the tongue 20, and having inclined flanking surfaces 41 sloping from the dividing edge toward the sides of the tongue 20. A skirt 42 is also provided around the lower edge of the hood 40 which, as shown in FIG. III, also slopes toward the side of the tongue 20 to form diverging spaces between the skirt 42 and adjacent surface 35 of the angle iron 21. Relative motion between these surfaces causes material to be cammed or vibrated laterally out of such spaces.

Any debris on the top surface of the tongue 20 that passes beneath the skirt 42 of the hood 40 meets an upstanding wall 43 attached to the upper surface of the tongue 20 and is diverted by such wall toward the sides of the tongue 20 so that it cannot accumulate against the forward or upper end of the resilient block 30. The vibratory movement of the tongue 20 combined with the angle of inclination of the wall 43 provides an efficient conveying action to move such debris from the upper surface of the tongue 20.

The lower resilient block 31 is preferably positioned so that its forward edge is flush with the corner of the lower angle iron 26 so that there is no shelf or lodging place for material adjacent the forward end of such rubber block.

In another type of construction used where headroom is at a premium, the frame of a conveyor may extend upwardly along the sides of the conveyor trough itself. A vibratory mount for use in such types of apparatus is illustrated in FIGS. IV, V and VI. Referring to FIG. IV, which is a side elevation of such a mount, the mount comprises a tongue 50 which, as shown in FIG. V, may be the web of a short piece of T-section bar having flanges 51 attached to a side of a conveyor trough 52. The web or tongue 50 is sandwiched between a pair of rubber or elastomer blocks 53 and 54 the lower one of which rests on the upper surface of a shelf 55 extending laterally from a base portion 56 of the frame of the apparatus. A plurality of reinforcing plates 57 may be employed between the shelf 55 and the side of the base portion 56 to reinforce the shelf.

A pressure plate 60 is forced downwardly against the upper surface of the upper rubber block 53 by a plurality of tie bars 61 which extend longitudinally along and are welded to the pressure plate 60 and then extend diagonally downwardly with their ends welded to cross bars 62 that are bolted to the shelf 55. This provides a rigid support for the pressure plate 60 so that it cannot follow the relative vibratory movements of the web or tongue 50 with respect to the base.

In this arrangement a thin metallic shield 63 is preferably attached to the underside of the forward ends of the tie bars 61 to prevent debris from dropping directly onto the shelf 55 above the upper ends of the blocks 53 and 54. Furthermore, the upper end of the lower resilient block 54 is preferably tapered like a snow plow to present a pair of outwardly and downwardly inclined surfaces which when vibrated by the vibratory motion of the tongue 50 cause any debris thereon to move laterally out of the space between the upper end of the block 54 and the shield 63.

At the opposite end the tie bars 61 are sharpened on their edges facing the lower ends of the rubber blocks 53, 54 so as to prevent any accumulation of debris ahead of these tie bar ends. This sharpening is not essential since the narrow width of the tie bars 61 is such that accumulation of debris ahead of the individual bars tends to build up a small triangular section that causes any additional material to be diverted sideways past the tie bars and through the spaces between the bars or laterally past the outside bars. It is essential however, that space be provided for the escape of any debris working into this space to prevent the buildup of any pressure between the tie bars 61 and the ends of the rubber blocks 53 and 54.

As is indicated in FIG. IV it is preferable that the shelf 55 be rabbeted along each end to a depth sufficient to receive the cross bars 62 and thereby avoid forming any pockets or offsets in which debris may lodge.

The principles of the invention may also be employed in the construction of struts to support the lower end of the tongue in an assembly similar to that shown in FIGS. I and II. In this arrangement, as shown in FIGS. VII and VIII, a tongue 70 that is attached to the lower surface of an angle iron 71 secured to the lower portion of the conveyor trough 72 has its lower and otherwise free end supported by a plurality of struts 73 the upper ends of which are attached to an angle iron 74 secured to the conveyor trough 72.

The resilient members in this construction are similar to those shown in FIG. II and comprise a pair of rubber blocks, similar to the blocks 30 and 31, one above and one below the tongue, that are held compressed between a downwardly facing surface in the upper portion of a yoke 75 and an upwardly facing surface of the long flange of an angle iron 76 to which the yoke 75 is bolted. If desired, spacers 77 may be inserted between the upwardly directed surface of the angle iron 76 and the bottom flanges of the yoke 75 to vary the amount of compression of the rubber.

In this arrangement at least the upper one of the rubber blocks has a plow shaped forward end 79 (FIG. VIII) which in cooperation with the longitudinal vibration of the tongue 70 causes debris on the upper surface of the tongue to be discharged laterally. As a further protection a hood 80 is preferably supplied to assist in guarding the area at the upper end of the rubber block from any collection of debris.

The struts 73 are preferably made of angle iron, for maximum rigidity, and are oriented so that the corner of the angle is directed toward the adjacent end of the rubber blocks. In this position any debris settling between the struts 73 and the adjacent ends of the rubber blocks has a chance to escape between the struts and there are no forwardly facing flat surfaces on which such debris may lodge.

In each of these arrangements the vibratory action of the members is employed as an active force for discharging any foreign material from the critical areas at the ends of the rubber blocks before such foreign material or debris may collect in sufficient quantities to cause any slippage of the rubber blocks and resulting deterioration.

Various modifications in the exact details of construction may be made without departing from the spirit and scope of the invention as defined in the following claims.

Having described the invention, I claim:

1. In a support for a vibratory work member that vibrates along a generally linear path, in combination, a tongue extending from said work member, a base, a yoke mounted on the base to provide with the base a pair of spaced opposed surfaces extending parallel to said path with said tongue positioned therebetween, a pair of elastomer blocks compressed and frictionally held between said opposed surfaces and said tongue to be stressed in shear by vibratory movement of the work member along said path, and means including diverting surfaces the intersections of which with the surface of the tongue are inclined laterally and downwardly across the face of the tongue at an angle to the path of vibration of the work member, said means being located in the space between the ends of said blocks and adjacent portions of said base and yoke for ejecting debris from said space.

2. In a support for vibratory work member that vibrates along a generally linear path, in combination, a tongue extending from the work member and having surfaces extending parallel to the path of vibration, a base, a yoke attached to the base, said base and yoke having parallel surfaces spaced from and opposed to the surfaces of said tongue, a pair of elastomer blocks compressed and frictionally held between said opposed surfaces, and deflectors having inclined faces interposed between the ends of said blocks and adjacent portions of the yoke for ejecting debris from said spaces, said deflectors having faces the intersections of which with the surface of the tongue are laterally and downwardly diverging lines located generally at the upper end of the elastomer blocks above said tongue.

3. In a support for a vibratory work member that vibrates along a generally linear path, in combination, a tongue extending from the work member and having surfaces extending generally parallel to the path of vibration, a base, a yoke attached to the base, said base and yoke having surfaces parallel to and spaced from the surfaces of said tongue, elastomer blocks compressed between said parallel surfaces and stressed in shear by vibratory movement of the work member along the path, at least some of said blocks having inclined faces diverging laterally from a vertical medial plane at their upper ends adapted to dislodge debris from the spaces between the ends of the blocks and the adjacent portions of the base and yoke.

4. In a support for a vibratory work member that vibrates along a generally linear path, in combination, a tongue extending from the work member and having surfaces extending generally parallel to the path of vibration, a base, a yoke attached to the base, said base and yoke having surfaces parallel to and spaced from the surfaces of said tongue, elastomer blocks compressed and frictionally held between said parallel surfaces and stressed in shear by vibratory movement of the work member along the path, at least some of said blocks having inclined faces diverging from a vertical medial plane at their upper ends adapted to dislodge debris from the spaces between the ends of the blocks and the adjacent portions of the base and yoke.

5. In a support for a vibratory work member that vibrates along an inclined linear path, in combination, a generally flat tongue extending from the work member and having surfaces parallel to the path of vibration, a base, a clamp plate, said base and said clamp plate being on opposite sides of said tongue and having surfaces spaced from and parallel to the surfaces of the tongue, a pair of elastomer blocks interposed between the surfaces of said tongue and the parallel surfaces of the base and clamp plate, and a plurality of generally parallel tie bars rigidly positioning the clamp plate with the elastomer blocks compressed between said surfaces, said tie bars being spaced apart to provide an escape for debris tending to collect adjacent the ends of the elastomer blocks.

6. In a support for a vibratory work member that vibrates along an inclined path, in combination, a generally flat tongue attached to the work member and extending along the path of vibration, a base, a clamp plate, a pair of elastomer blocks compressed between the base and clamp plate with the tongue sandwiched therebetween, said blocks being stressed in shear by vibration of said work member, a hood attached to the upper end of said clamp plate and extending downwardly toward the tongue, and a diverting wall erected on the tongue and extending upwardly into the hood, said hood and wall diverging downwardly whereby any debris tending to collect on said tongue adjacent the elastomer blocks is urged laterally from the tongue, whereby the spaces adjacent the ends of the blocks is cleared of debris.

7. A support and guard according to claim 6 in which the diverting wall comprises the upper end of the upper elastomer block having diverting walls shaped to urge debris laterally from the space adjacent the upper end of the block.

References Cited in the file of this patent

UNITED STATES PATENTS 2,284,692    Strube _____ June 2, 1942

FOREIGN PATENTS 812,033    Great Britain _____ Apr. 15, 1959